Z. D. BUTTS.
RESILIENT WHEEL.
APPLICATION FILED SEPT. 21, 1911.

1,034,975.

Patented Aug. 6, 1912.
2 SHEETS—SHEET 1.

Witnesses.
William Scheibel.
N. L. Richey.

Inventor
Zehner D. Butts.
by
John A. Bommhardt & Att'ys

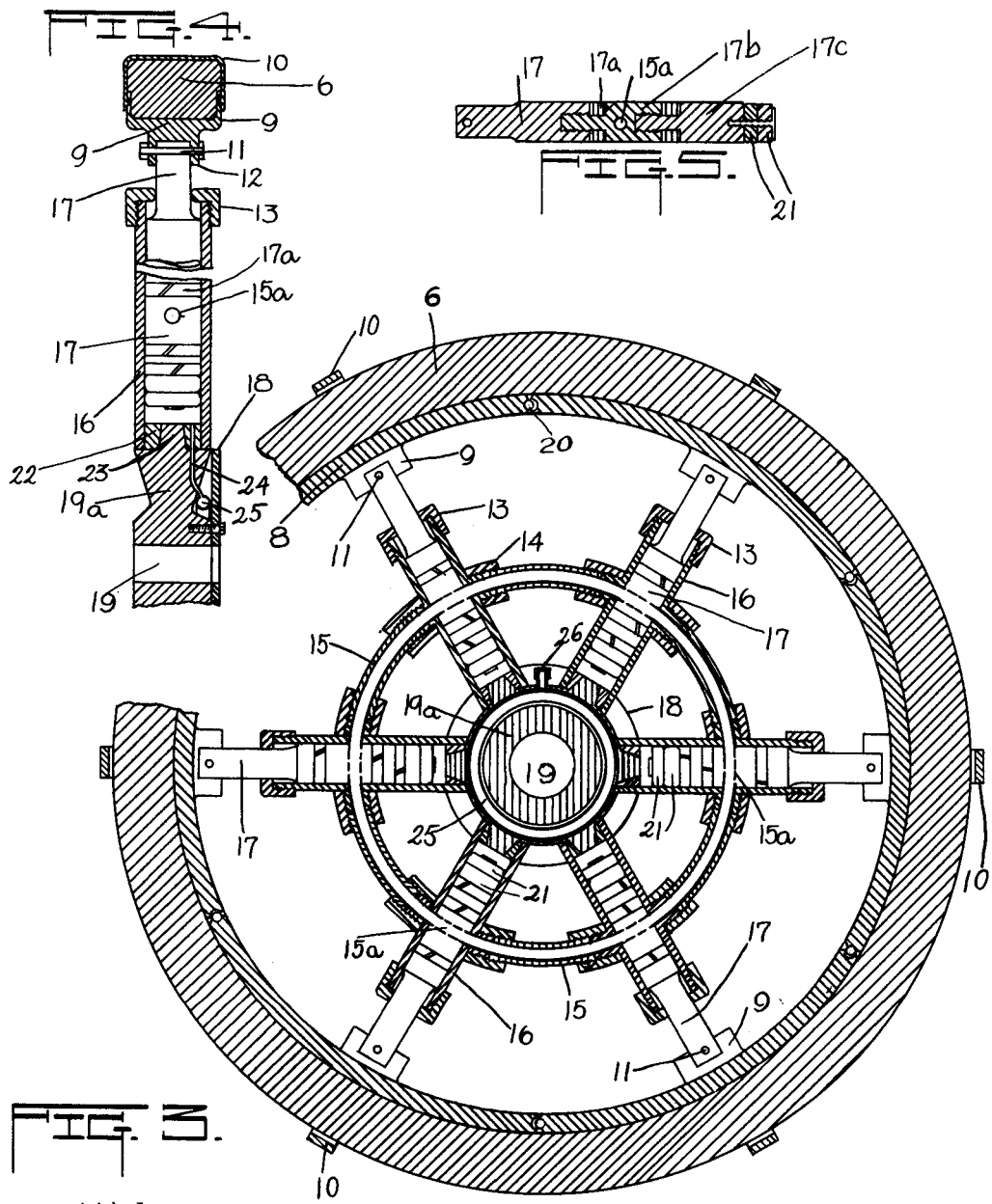

UNITED STATES PATENT OFFICE.

ZEHNER D. BUTTS, OF CLEVELAND, OHIO.

RESILIENT WHEEL.

1,034,975.   Specification of Letters Patent.   Patented Aug. 6, 1912.

Application filed September 21, 1911. Serial No. 650,658.

*To all whom it may concern:*

Be it known that I, ZEHNER D. BUTTS, citizen of the United States, residing at Cleveland, in the county of Cuyahoga and State of Ohio, have invented certain new and useful Improvements in Resilient Wheels, of which the following is a specification.

This invention relates to wheels for vehicles, such as automobiles and the like and has for its object to provide an improved wheel of the type utilizing a series of plunger spokes supported by compressed air and affording a resilient structure which will have the advantages, without the defects, of a pneumatic tire.

The invention is illustrated in the accompanying drawings, in which—

Figure 1:
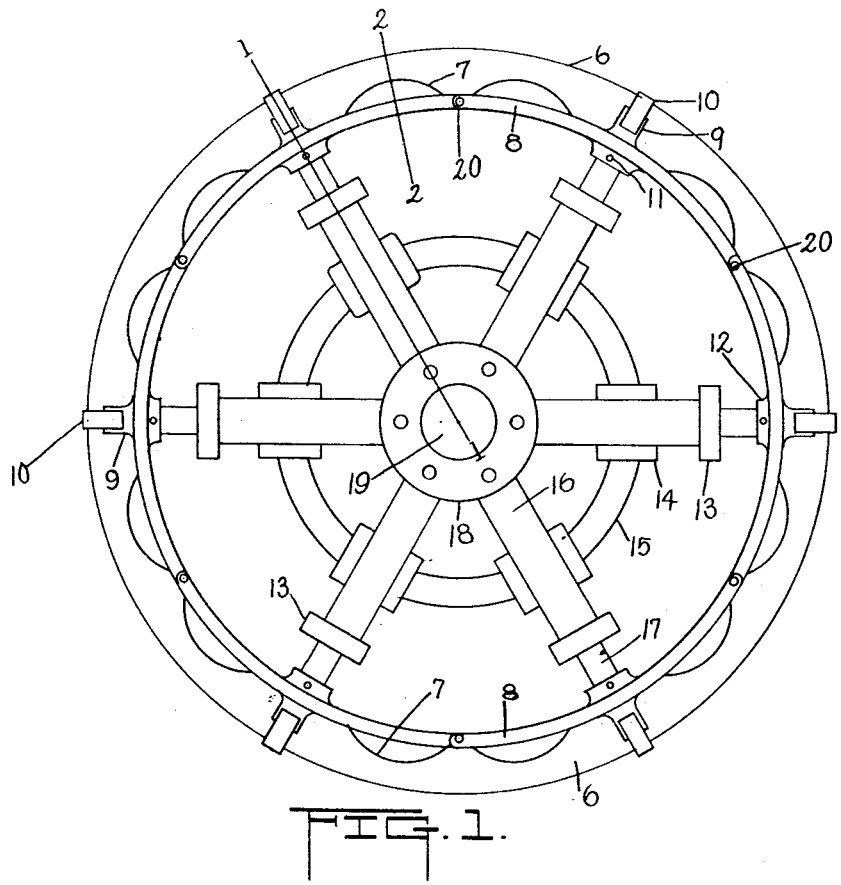
Figure 2:
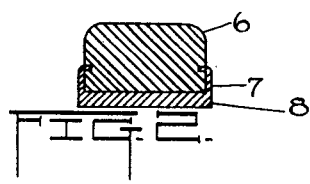

Figure 1 is a side elevation of the wheel. Fig. 2 is a detail in cross section of the rim. Fig. 3 is a longitudinal section of the wheel partially broken away. Fig. 4 is a cross section of the rim, a spoke, and part of the hub. Fig. 5 is a longitudinal section of a plunger.

Referring specifically to the drawings, 8 indicates a felly made in sections pivoted together at 20, and upon this is mounted a solid rubber tire 6, held to the felly by side clips 7 struck up from the edges of the felly. 10 are non-skidding bands extending across the tire and fastened to projections 9 at the edges of the felly.

A plunger 17 is fastened to each felly section by a pivot pin 11 and ears 12 on the felly. This plunger works in a radial cylinder 16 confined by a screw cap 13. The various cylinders are connected by curved pipe sections 15, united to nipples on the cylinders by unions 14, and forming a continuous pipe which contains oil and also serves to brace the cylinders. Each plunger has a hole 15ª through the same, which connects the pipes 15 to form a continuous passage, at least when the plungers are in normal position. The purpose of the oil is to lubricate the plungers.

Each cylinder has a driving fit at its inner end upon a bushing 22 on a stub 23 projecting from the hub 19ª, the eye of which is indicated at 19 and the side plates of which are indicated at 18. Air is admitted under the plungers from a pipe 25, extending around one side of the hub in a recess therein under the plate 18, through ports 24 formed in the hub and the bushing 22, and air may be pumped into the pipe 25 through a nipple 26, as necessary.

As shown especially in Fig. 5 the plunger head is made in sections, 17, 17ᵇ and 17ᶜ screwed together by threaded stems, with spaces between large enough to receive packing rings 17ª. Solid rubber caps 21 are provided to cushion excessive impact. New plunger sections can be substituted as needed.

In use, the pipes 15 are first filled with oil, and then air is pumped into the pipe 25 and cylinders. The oil will circulate and lubricate the plungers. The plungers are cushioned on the compressed air and will afford the requisite resiliency to the wheel, in connection with the rubber tire, avoiding all puncture difficulties and the expenses attendant on pneumatic tires.

I claim:

1. In a wheel, the combination with a hub and a felly, of cylinders and plungers working therein between the hub and felly, and rigid oil pipes extending between the cylinders, said oil pipes being located outside of the hub and forming a rigid circular brace for the cylinders.

2. In a wheel, the combination with a hub and a felly, of cylinders and plungers working therein between the hub and felly, the plungers comprising sections each having a threaded stem screwed into the adjacent section and packing rings between the sections.

In testimony whereof, I do affix my signature in presence of two witnesses.

ZEHNER D. BUTTS.

Witnesses:
JOHN A. BOMMHARDT,
STEDMAN J. ROCKWELL.